(12) United States Patent
Becka et al.

(10) Patent No.: US 12,038,080 B2
(45) Date of Patent: Jul. 16, 2024

(54) SUPPORTING DEVICE FOR TWO TRANSMISSIONS AND DEVICE HAVING A SUPPORTING DEVICE OF THIS KIND

(71) Applicant: Flender GmbH, Bocholt (DE)

(72) Inventors: Simon Becka, Wesel (DE); Volker Düvel, Bocholt (DE); Marvin Schlütter, Bocholt (DE)

(73) Assignee: Flender GmbH, Bocholt (DE)

( * ) Notice: Subject to any disclaimer, the term of this patent is extended or adjusted under 35 U.S.C. 154(b) by 456 days.

(21) Appl. No.: 17/604,696

(22) PCT Filed: Apr. 8, 2020

(86) PCT No.: PCT/EP2020/059988
§ 371 (c)(1),
(2) Date: Oct. 18, 2021

(87) PCT Pub. No.: WO2020/229062
PCT Pub. Date: Nov. 19, 2020

(65) Prior Publication Data
US 2022/0196138 A1    Jun. 23, 2022

(30) Foreign Application Priority Data
May 10, 2019  (EP) ..................................... 19173858

(51) Int. Cl.
*F16H 57/025* (2012.01)
*B02C 4/42* (2006.01)
(Continued)

(52) U.S. Cl.
CPC .......... *F16H 57/025* (2013.01); *B02C 4/426* (2013.01); *F16H 35/06* (2013.01); *B02C 4/02* (2013.01)

(58) Field of Classification Search
CPC ...... F16H 57/025; F16H 35/06; F16H 57/021; B02C 4/42; B02C 4/02; B02C 4/426
(Continued)

(56) References Cited

U.S. PATENT DOCUMENTS

| 1,664,129 A | * | 3/1928 | Pallenberg | ............. B60N 2/506 |
| | | | | 5/278 |
| 4,500,054 A | * | 2/1985 | Osborn | ...................... F02C 7/20 |
| | | | | 244/54 |

(Continued)

FOREIGN PATENT DOCUMENTS

| EP | 0 775 525 A1 | 5/1997 |
| EP | 0 992 710 A2 | 4/2000 |
| WO | WO 2017/091684 A1 | 6/2017 |

OTHER PUBLICATIONS

International Search Report issued by the European Patent Office in International Application PCT/EP2020/059988 on Apr. 8, 2020.

*Primary Examiner* — Terrell L McKinnon
*Assistant Examiner* — Michael McDuffie
(74) *Attorney, Agent, or Firm* — Henry M. Feiereisen LLC (57) ABSTRACT

A supporting device includes first and second supporting flanges coupled with first and second transmissions, respectively, and a support via which a supporting force is transmittable from the first supporting flange to the second supporting flange. The support includes a lever element which is coupled in an articulated manner with an attachment element on the first supporting flange and thus articulated with the first supporting flange, and a supporting element which is coupled in an articulated manner with the lever element and connected to the second supporting flange and which includes two spaced-apart supporting parts. The lever element is arranged partly between two spaced-apart attachment parts of the attachment element and partly (Continued)

between the supporting parts of the supporting element and is coupled in an articulated manner with the attachment element via the attachment parts and in an articulated manner with the supporting element via the supporting parts.

15 Claims, 4 Drawing Sheets

(51) Int. Cl.
  *F16H 35/06* (2006.01)
  *B02C 4/02* (2006.01)

(58) Field of Classification Search
  USPC ........ 248/637, 658, 659, 671, 675; 241/232, 241/101.2, 227, 230
  See application file for complete search history.

(56) References Cited

U.S. PATENT DOCUMENTS

| | | | |
|---|---|---|---|
| 5,803,428 A * | 9/1998 | Marello | B24B 23/06 |
| | | | 248/676 |
| 6,247,383 B1 | 6/2001 | Chun | |
| 7,469,851 B2 * | 12/2008 | Bartosch | B02C 4/42 |
| | | | 241/230 |
| 10,670,135 B2 * | 6/2020 | Düvel | F16H 57/021 |
| 10,934,931 B2 * | 3/2021 | Goleczka | H02K 19/16 |
| 11,007,533 B2 * | 5/2021 | Hoffmann | B02C 4/02 |
| 2020/0340565 A1 * | 10/2020 | Troester | F16H 49/001 |
| 2022/0196138 A1 * | 6/2022 | Becka | B02C 4/426 |
| 2022/0268350 A1 * | 8/2022 | Hirabayashi | H02K 5/24 |
| 2022/0288598 A1 * | 9/2022 | Schuerman | B02C 4/283 |

* cited by examiner

SUPPORTING DEVICE FOR TWO TRANSMISSIONS AND DEVICE HAVING A SUPPORTING DEVICE OF THIS KIND

CROSS-REFERENCES TO RELATED APPLICATIONS

This application is the U.S. National Stage of International Application No. PCT/EP2020/059988, filed Apr. 9, 2020, which designated the United States and has been published as International Publication No. WO 2020/229062 A1 and which claims the priority of European Patent Application, Serial No. 19173858.2, filed May 10, 2019, pursuant to 35 U.S.C. 119(a)-(d).

BACKGROUND OF THE INVENTION

The invention relates to a supporting device for two transmissions. The invention relates further to a device having such a supporting device.

EP 0 775 525 A1 discloses a torque supporting system for two rollers driven in opposite directions, of which one is arranged fixedly and the other is arranged so as to be displaceable relative to the fixed roller in a machine frame. The rollers are each provided on the same roller side with a journal, on which a transmission is mounted. Torque supports are fixedly connected to the transmissions, to which in each case two points of articulation are connected together in an articulated manner by tie rods. It is thereby provided that all the points of articulation of the tie rods are arranged on one side of a mid plane extending through the axes of the rollers.

A double-sided torque support for a transmission mounted on the machine shaft of a work machine is additionally to be inferred as known from EP 0 992 710 A2.

An arrangement of the type defined at the beginning is known from WO 2017/091684 A1, which arrangement provides a "simple" supporting system which does not reduce the bending moment in the supporting flange.

The object of the present invention is to provide a supporting device and a device having such a supporting device, so that particularly low-load operation can be achieved.

SUMMARY OF THE INVENTION

This object is achieved according to the invention by a supporting device as set forth hereinafter, and by a device as set forth hereinafter. Advantageous embodiments with expedient further developments of the invention are described in the remaining claims.

A first aspect of the invention relates to a supporting device for, in particular at least or exactly, two transmissions and thus, for example, for a transmission pair which is formed by the transmissions. The supporting device, which, for example, is also referred to as a torque support or functions as a torque support, has a first supporting flange which can be coupled, in particular in a torque-transmitting manner, with a first of the transmissions. In particular, the first supporting flange, for example, can be coupled, in particular in a torque-transmitting manner, with a first housing of the first transmission. In particular it is conceivable that the first supporting flange can be coupled or is coupled in a rotationally secure manner with the first transmission, in particular with the first housing of the first transmission. In other words, the first supporting flange, for example, can be fixedly or rigidly connectable or connected to the first transmission, in particular to the first housing of the first transmission.

The supporting device additionally has a second supporting flange which can be coupled, in particular in a torque-transmitting manner, with the second transmission. In particular, it is conceivable that the second supporting flange can be coupled, in particular in a torque-transmitting manner, with a second housing of the second transmission. It can thereby be provided in particular that the second supporting flange can be coupled or is coupled in a rotationally secure manner with the second transmission, in particular with the second housing. In other words, the second supporting flange, for example, can be rigidly or fixedly couplable or coupled with the second transmission, in particular with the second housing. Because the respective supporting flange can be coupled or is coupled in particular in a torque-transmitting manner with the respective transmission, a torque or a reaction torque resulting from a torque, for example, can be transmitted to the respective supporting flange and supported via the respective supporting flange upstream of the respective transmission, in particular upstream of the respective housing, in particular such that the respective housing is supported and thereby secured against rotation. It is thereby possible in particular to support a respective transmission element, for example a transmission element connected in a rotationally secure manner to the respective housing, of the respective transmission and thus secure it against rotation.

The supporting device has at least one support via which a supporting force can be transmitted from the first supporting flange to the second supporting flange. This means, for example, with regard to the above-mentioned torque or reaction torque, that the torque or reaction torque, for example, can be transmitted from the first housing to the first supporting flange and from the first supporting flange via the support to the second supporting flange and can thereby be supported. The at least one support has a lever element, which is also referred to as a strut or strut element, which is coupled in an articulated manner with an attachment element provided on the first supporting flange and thus in an articulated manner with the first supporting flange. In particular it is provided that the lever element is coupled in an articulated manner with the attachment element and with the first supporting flange by means of a linkage, in particular exactly one linkage. The attachment element is, for example, a so-called lug which, for example, protrudes from the supporting flange itself, in particular in the radial direction of the first transmission.

In principle it is conceivable that the attachment element is formed in one piece with the first supporting flange, or the attachment element and the first supporting flange are structural parts which are formed separately from one another and connected together, in particular in a rotationally secure manner.

The at least one support additionally has a supporting element coupled in an articulated manner with the lever element, which supporting element is coupled with the lever element in an articulated manner, for example, by means of a second linkage, in particular exactly one second linkage. The supporting element is additionally connected to the second supporting flange. In particular, the supporting element is connected to the second supporting flange in a torque-transmitting, in particular rotationally secure, manner. The torque or reaction torque, for example, can thereby be transmitted from the first housing to the first supporting flange, from the first supporting flange via the attachment element to the lever element, from the lever element to the supporting element and from the supporting element to the second supporting flange, and thereby be supported. The lever element is preferably formed separately from the attachment element, separately from the supporting flanges and separately from the supporting element, wherein the supporting flanges are also referred to as flanges. The supporting element can further be formed separately from the lever element and separately from the supporting flanges.

In order to be able to achieve particularly low-load operation of the supporting device, it is provided according to the invention that the attachment element has two attachment parts spaced apart from one another, in particular in the axial direction of the first transmission. The attachment parts can be formed in one piece with one another, or the attachment parts are in the form of structural parts which are formed separately from one another and connected together, in particular via the first supporting flange.

It is further provided according to the invention that the supporting element has two supporting parts spaced apart from one another, in particular in the axial direction of the first transmission. The supporting parts can be formed in one piece with one another, or the supporting parts can be in the form of structural parts which are formed separately from one another and connected together, in particular via the second supporting flange. It is additionally provided according to the invention that the lever element is arranged partly between the attachment parts and partly between the supporting parts. The lever element is thereby coupled in an articulated manner with the attachment element and thus with the first supporting flange via the attachment parts. The lever element is additionally coupled in an articulated manner with the supporting element via the supporting parts. Because the supporting element has the supporting parts spaced apart from one another, the supporting element is of double-section design. Particularly low-load operation can thereby be achieved. The invention is based in particular on the following findings:

It can be desirable for reasons of installation space and thus space to arrange the supporting flanges and in particular the support in such a manner that the lever element is not tensile-loaded but compression-loaded. This can lead to a compression load at one end of the support that faces or is associated with the second supporting flange, which in turn can lead to tensile loading of the second supporting flange. Such tensile loading and tensile stresses on the respective supporting flange resulting therefrom can be undesirable or disadvantageous and in particular can lead to an additional bending stress on the respective supporting flange. Consequently, the respective supporting flange would have to be produced from a particularly strong, in particular higher strength material, which can lead to undesirably high costs of the supporting device. It is further conceivable to dimension the respective supporting flange so that it is particularly large or solid, which can lead, however, to an undesirably high weight and to an undesirably high space requirement of the supporting device.

By means of the described double-section design of the supporting element, excessive loads, in particular on the second supporting flange, can be avoided, so that the respective supporting flange, or the supporting device as a whole, can be configured to be particularly intricate and thus advantageous in terms of weight, costs and installation space. In particular, a load introduction, in particular into the second supporting flange, such that bending moments which cancel each other out are obtained can be achieved. Undesirable and excessive bending stresses in the second supporting flange can thus be avoided. The double-section configuration, in particular at the second supporting flange, additionally has the result that, for example compared to a single-section configuration of the supporting element, twice the amount of force can be transmitted via friction. As a result, screws, in particular shoulder screws, that are used, for example, can be relieved of load, so that the supporting device can be configured to be particularly intricate.

Since the supporting element has the two supporting parts spaced apart from one another, between which the lever element is arranged, and because the lever element is coupled in an articulated manner with the supporting element via the supporting parts spaced apart from one another, a double-section, articulated attachment of the supporting element to the lever element is achieved. This double-section attachment can preferably also be applied to the second supporting flange. It is thereby preferably provided that the supporting element has two supporting regions spaced apart from one another, in particular in the axial direction of the second transmission, between which the second supporting flange is arranged, wherein the second supporting flange is connected to the supporting element, in particular in a torque-transmitting or rotationally secure manner, via the supporting regions. A double-section but preferably fixed or rotationally secure attachment of the supporting element to the second supporting flange is thereby also provided, so that excessive, undesirable bending loads on the second supporting flange can be avoided. It is thereby conceivable that the supporting regions are formed in one piece with one another, or the supporting regions are in the form of structural parts which are formed separately from one another and connected together, in particular via the second supporting flange. In particular it is conceivable that a first of the supporting parts and a first of the supporting regions are formed in one piece with one another and are thus formed, for example, by a one-piece first component, wherein, for example, the second supporting part and the second supporting region are formed in one piece with one another and are thus formed, for example, by a one-piece second component. The components are in the form of structural parts which are formed separately from one another and connected together, in particular via the second supporting flange and/or via the lever element. In particular, the respective component can be formed from a metal sheet and thus, for example, be in the form of a metal sheet or a sheet-metal structural part. Alternatively or in addition it is conceivable that the respective attachment part is formed from a metal sheet and is thus in the form of a metal sheet or a sheet-metal structural part.

The first supporting element is preferably connected, in particular in a torque-transmitting or rotationally secure manner, to the second supporting flange, which can be arranged between the supporting regions, via the supporting regions spaced apart from one another in particular in the axial direction of the second transmission.

Overall, it can be seen that, by means of the double-section configuration of the supporting element, a particularly advantageous supporting system with a particularly advantageous force introduction at the supporting element can be achieved, in particular such that an excessive bending load can be avoided.

In particular it is conceivable that the components are symmetrical in form, wherein it can be provided alternatively or in addition that the attachment parts are configured to be symmetrical to one another. In particular, it is possible to achieve a load introduction into the support and the corresponding, second supporting flange that is at least almost free of bending moment, so that excessive loading of the second supporting flange, which in particular is tensile-loaded, can be avoided. Consequently, undesirable overdimensioning of the supporting device can be avoided. Moreover, the lever element can be designed as a particularly simple strut structure, which is thus advantageous in terms of weight and costs. Furthermore, respective wall thicknesses, in particular sheet-metal thicknesses, of the components can be kept small, so that the weight of the support can be kept particularly low. Moreover, particularly high processing speeds on burning out can be achieved. Furthermore, a dual-section loading of the above-mentioned screws, in particular shoulder screws, can be achieved, so that material that is used can be utilized particularly well. The respective double-section attachment or loading is to be understood in particular as meaning that the support is attached to the lever element or to the second supporting flange via at least or exactly two parting lines. Moreover, the double-section loading of the screws can be understood as meaning that the screws are loaded by or via two parting lines, so that the load on the screws can be kept particularly low.

In order to be able to keep the costs and the weight of the supporting device particularly low, it is provided in one embodiment of the invention that the lever element is formed in one piece.

A further embodiment is distinguished in that the respective supporting flange is in the form of a cast structural part. The respective supporting flange can thereby be formed in particular of cast iron. The costs of the supporting device can thereby be kept particularly low. Moreover, excessive loading, in particular of the tensile-loaded second supporting flange, can be avoided.

In a particularly advantageous embodiment of the invention, the supporting element, in the installed position of the supporting device, is arranged at least predominantly, in particular completely, beneath the supporting flange in the vertical direction. The supporting device thereby occupies its installed position in the fully produced state of a device in the form of, for example, a system, machine or apparatus which in its fully produced state has the supporting device and the transmissions. The installed position of the supporting device and thus of the device is a position or orientation of the device and thus of the supporting device provided for the intended use of the device and in particular of the supporting device, in particular in space. Because the supporting element, based on the installed position, is arranged at least predominantly, in particular completely, beneath the supporting flange in the vertical direction, the space requirement of the supporting device can be kept particularly low. The feature that the supporting element, in the installed position of the supporting device, is arranged at least predominantly beneath the supporting flange can be understood in particular as meaning that the supporting element is arranged with more than half of its volume, or its outer circumferential form, beneath the supporting flange.

In order to achieve operation which is particularly advantageous and advantageous in terms of installation space, it is provided in a further embodiment of the invention that the supporting device has a second support via which a second supporting force can be transmitted from the second supporting flange to the first supporting flange. A torque or reaction torque, for example, can thereby be transmitted from the second transmission, in particular from the second housing of the second transmission, via the second supporting flange to the second support and from the second support to the first supporting flange, whereby the second housing can be supported and in particular secured against rotation. The relevant observations relating to the first transmission and to the first support can also be applied mutatis mutandis to the second transmission and the second support and vice versa.

The second support has a second lever element, also referred to as a second strut or second strut element, which is coupled in an articulated manner with a second attachment element provided on the second supporting flange and thus in an articulated manner with the second supporting flange. In particular, the second lever element, for example, is coupled in an articulated manner with the attachment element and thus with the second supporting flange by means of a third linkage, in particular exactly one third linkage. The second support additionally has a supporting element coupled in an articulated manner with the second lever element, which supporting element is connected, in particular in a torque-transmitting and/or rotationally secure manner, to the first supporting flange. In particular, the second supporting element, for example, is coupled in an articulated manner with the second lever element by means of a fourth linkage, in particular exactly one fourth linkage. By using the second support, the second transmission can also be supported particularly advantageously and in particular in a manner that is particularly advantageous in terms of installation space.

It has been shown to be particularly advantageous if, in the installed position of the supporting device, the second supporting element is arranged at least predominantly, in particular completely, above the supporting flange in the vertical direction. The space requirement of the supporting device can thereby be kept in a particularly small frame. The feature that, in the installed position of the supporting device, the second supporting element is arranged at least predominantly above the supporting flange in the vertical direction can be understood as meaning in particular that the second supporting element, in the installed position of the supporting device, is arranged with more than half of its volume, or its outer circumferential form, above the supporting flange hi the vertical direction.

It has been shown to be particularly advantageous if the lever element has two first lever parts spaced apart from one another, which are spaced apart from one another hi particular hi the axial direction of the second transmission. The second supporting element, which is coupled in an articulated manner with the second lever element via the first lever parts, is arranged between the first lever parts. The lever element additionally has two second lever parts spaced apart from one another, in particular in the axial direction of the second transmission, between which the second attachment element is arranged. The second attachment element is coupled in an articulated manner with the second lever element via the second lever parts. A particularly advantageous, inexpensive and low-load attachment of the second lever element to the second supporting element and to the second attachment element can thereby be ensured.

The first lever parts are formed, for example, in one piece with one another, wherein it can be provided alternatively or in addition that the second lever parts are formed in one piece with one another. It is further conceivable that the first lever parts are in the form of structural parts which are formed separately from one another and connected together and/or the second lever parts are in the form of structural parts which are formed separately from one another and connected together. In particular it is conceivable that a first of the first lever parts and a first of the second lever parts are formed by a first one-piece structural element. In addition, it is possible that the second of the first lever parts and the second of the second lever parts are formed by a one-piece second structural element. The structural elements are formed separately from one another and, for example, connected together.

In order to be able to keep the number of parts and thus the costs particularly low, it is provided in a further embodiment of the invention that the second supporting element and/or the second attachment element is formed in one piece. In principle it is conceivable that the second attachment element is formed in one piece with the second supporting flange. Alternatively, it is conceivable that the second attachment element and the second supporting flange are in the form of structural elements which are formed separately from one another and connected together. In particular it is conceivable that the second attachment element protrudes from the second supporting flange itself.

In order to achieve particularly low-load operation of the supporting device as a whole and consequently to be able to configure the supporting device to be particularly intricate and thus advantageous in terms of weight, costs and installation space, it is provided in one embodiment of the invention that the second attachment element has two second attachment parts spaced apart from one another. The second attachment parts can be formed in one piece with one another, or the second attachment parts are in the form of structural parts which are formed separately from one another and connected together, in particular via the second supporting flange. It is further possible in this embodiment that the second supporting element has two second supporting parts spaced apart from one another. The second supporting parts can be formed in one piece with one another, or the second supporting parts are in the form of structural parts which are formed separately from one another and connected together, in particular via the second supporting flange. The second attachment parts can be formed, for example, of sheet metal and thus be in the form of sheet-metal parts or metal sheets. Alternatively or in addition, the second supporting parts can be formed from a metal sheet and thus be in the form of metal sheets or sheet-metal parts.

It has further been shown to be advantageous if the second lever element is arranged partly between the second attachment parts and partly between the second supporting parts and is coupled in an articulated manner with the second attachment element via the second attachment parts and in an articulated manner with the second supporting element via the second supporting parts. A double-section attachment of the second supporting element to the second lever element and preferably also to the first supporting flange is thus preferably also provided with regard to the second supporting element, so that excessive loads and in particular excessive bending stresses on the first supporting flange can be avoided. In particular it is conceivable that the second supporting element has two second supporting regions spaced apart from one another, in particular in the axial direction of the first transmission, wherein the first supporting flange is arranged between the second supporting regions. The second supporting element, for example, is thereby connected, in particular in a torque-transmitting or rotationally secure manner, to the first supporting flange via the second supporting regions.

One of the second supporting regions and one of the second supporting parts can be formed by a one-piece first element, wherein the other second supporting region and the other second supporting part can be formed by a one-piece second element. The elements are, for example, elements formed separately from one another and connected together. The respective element can be formed, for example, of a metal sheet and thus be in the form of a metal sheet or in the form of a sheet-metal structural part.

In order to be able to keep the number of parts and thus the costs particularly low, it is preferably provided that the second lever element is formed in one piece.

A second aspect of the invention relates to a device in the form of, for example, an industrial device or industrial application, which can be, for example, a machine, an apparatus or a system. In particular, the device can be a transmission device. The device has a first transmission, into which drive power can be introduced via a first drive shaft having a first direction of rotation. The device additionally comprises a second transmission, into which drive power can be introduced via a second drive shaft having a second direction of rotation opposite to the first direction of rotation. This means that the drive shafts, which are also referred to simply as shafts, rotate in opposite directions, in particular during operation of the device. In other words, the shafts, which are also referred to as machine shafts, are counter-rotating relative to one another. For example, the first transmission is arranged on the first drive shaft, wherein it can be provided that the first transmission is mounted on the first drive shaft. Alternatively or in addition, the second transmission can be arranged on the second drive shaft, wherein it is conceivable that the second transmission is mounted on the second drive shaft. The drive shafts are spaced apart from one another, for example, in particular along their respective radial direction, and extend parallel to one another.

In other words, the first drive shaft, for example, is rotatable about a first axis of rotation in the first direction of rotation, wherein the second drive shaft is rotatable, or drivable, about a second axis of rotation in the second direction of rotation. The axes of rotation are preferably spaced apart from one another, wherein the axes of rotation preferably extend parallel to one another. Thus, an axially parallel arrangement of the drive shafts and consequently preferably also an axially parallel arrangement of the transmissions are provided. The device comprises a supporting device, in particular according to the first aspect of the invention. The supporting device permits torque support of at least one of the transmissions, in particular of both transmissions, in a manner that is particularly advantageous in terms of installation space. The supporting device is preferably in the form of a weldment via which, for example, the transmissions, in particular their housings, are connected to or coupled with one another. In particular it is preferably provided that the transmissions, in particular housings, are kinematically coupled with one another via the supporting device.

The supporting device has a first supporting flange which is coupled, in particular in a torque-transmitting manner, with the first transmission, and a second supporting flange which is coupled, in particular in a torque-transmitting manner, with the second transmission. The transmission additionally has at least one support, via which a supporting force can be transmitted from the first supporting flange to the second supporting flange. The at least one support has a lever element which is coupled in an articulated manner with an attachment element provided on the first supporting flange and thus in an articulated manner with the first supporting flange. The at least one support further has a supporting element which is coupled in an articulated manner with the lever element and connected, in particular in a torque-transmitting or rotationally secure manner, to the second supporting flange.

In order to be able to achieve particularly low-load operation of the device, it is provided in the second aspect of the invention that the attachment element has two attachment parts spaced apart from one another, in particular in the axial direction of the first transmission. The supporting element has two supporting parts spaced apart from one another, in particular in the axial direction of the transmission. The lever element is arranged partly between the attachment parts and partly between the supporting parts, wherein the lever element is coupled in an articulated manner with the attachment element via the attachment parts. The lever element is additionally coupled in an articulated manner with the supporting element via the supporting parts. Advantages and advantageous embodiments of the first aspect of the invention are to be regarded as being advantages and advantageous embodiments of the second aspect of the invention and vice versa.

It has been shown to be particularly advantageous if the respective transmission is in the form of a planetary transmission. The planetary transmission has, for example, at least or exactly one sun gear, at least or exactly one internal gear and at least or exactly one planetary carrier. The planetary transmission additionally comprises, for example, at least one or more planetary gears. The planetary gear is, for example, rotatably mounted on the planetary carrier and meshes simultaneously with the sun gear and with the internal gear. The sun gear, the internal gear and the planetary carrier are respective transmission elements of the respective planetary transmission, which is also referred to as a planetary set or planetary gear set. In particular it is conceivable that the sun gear is connected in a rotationally secure manner to the respective drive shaft. Alternatively or in addition it is conceivable that the internal gear is connected in a torque-transmitting or rotationally secure manner to the respective housing of the respective transmission or to the respective supporting flange.

Finally, it has been shown to be particularly advantageous if the device is hi the form of a comminution machine, in particular in the form of a roller grinding mill, for comminuting material to be comminuted, in particular for grinding material to be ground.

BRIEF DESCRIPTION OF THE DRAWING

Further advantages, features and details of the invention will become apparent from the following description of a preferred embodiment and with reference to the drawing. The features and feature combinations mentioned hereinbefore hi the description and the features and feature combinations mentioned hereinbelow in the description of the figures and/or shown in the figures alone are usable not only in the combination indicated in each case but also in other combinations or in isolation, without departing from the scope of the invention.

In the drawing.

DETAILED DESCRIPTION OF PREFERRED EMBODIMENTS

In the figures, elements that are identical or have identical functions are provided with the same reference signs.

Figure 1:
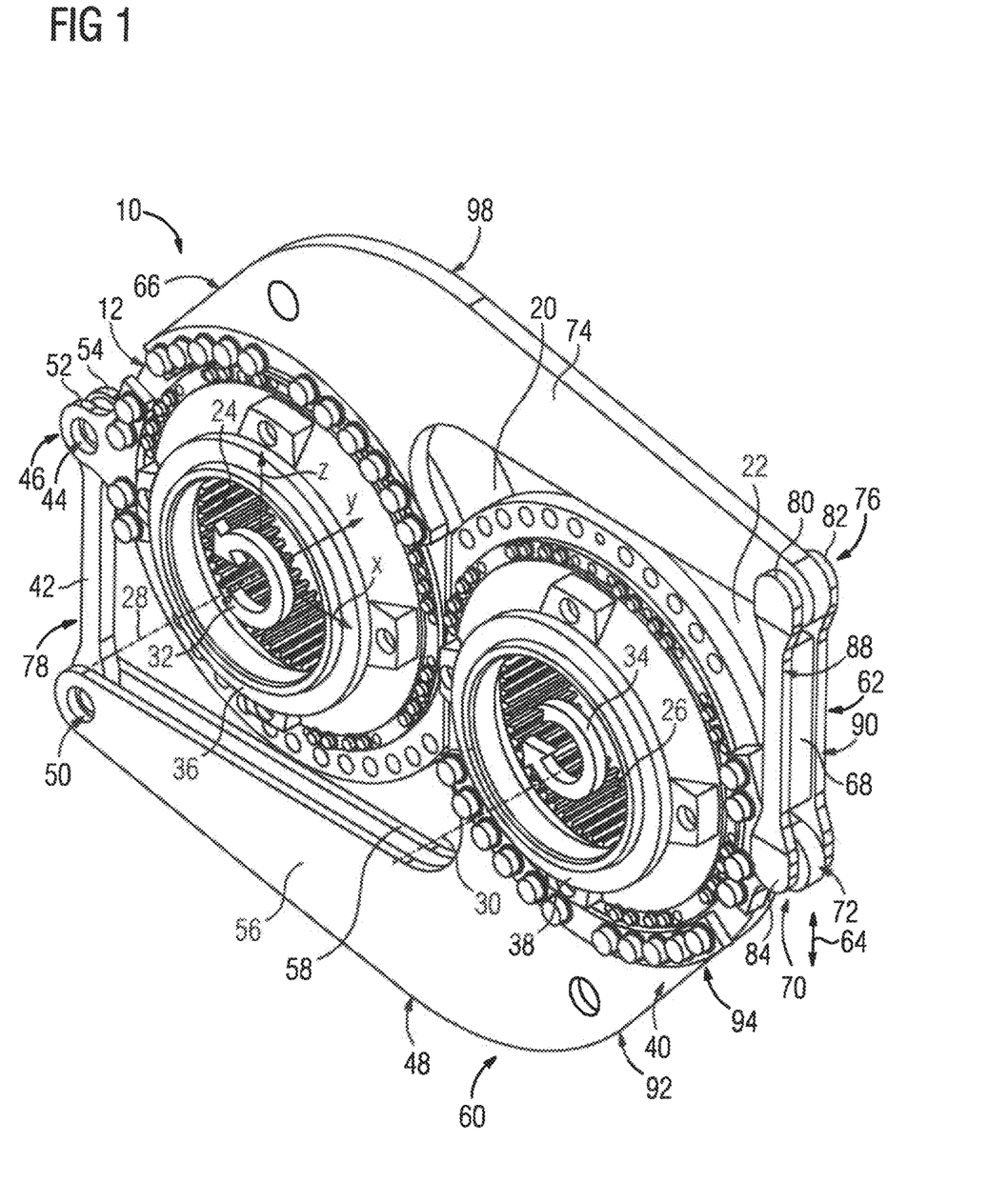
FIG. 1 is a schematic perspective view of part of a device according to the invention.
Figure 3:
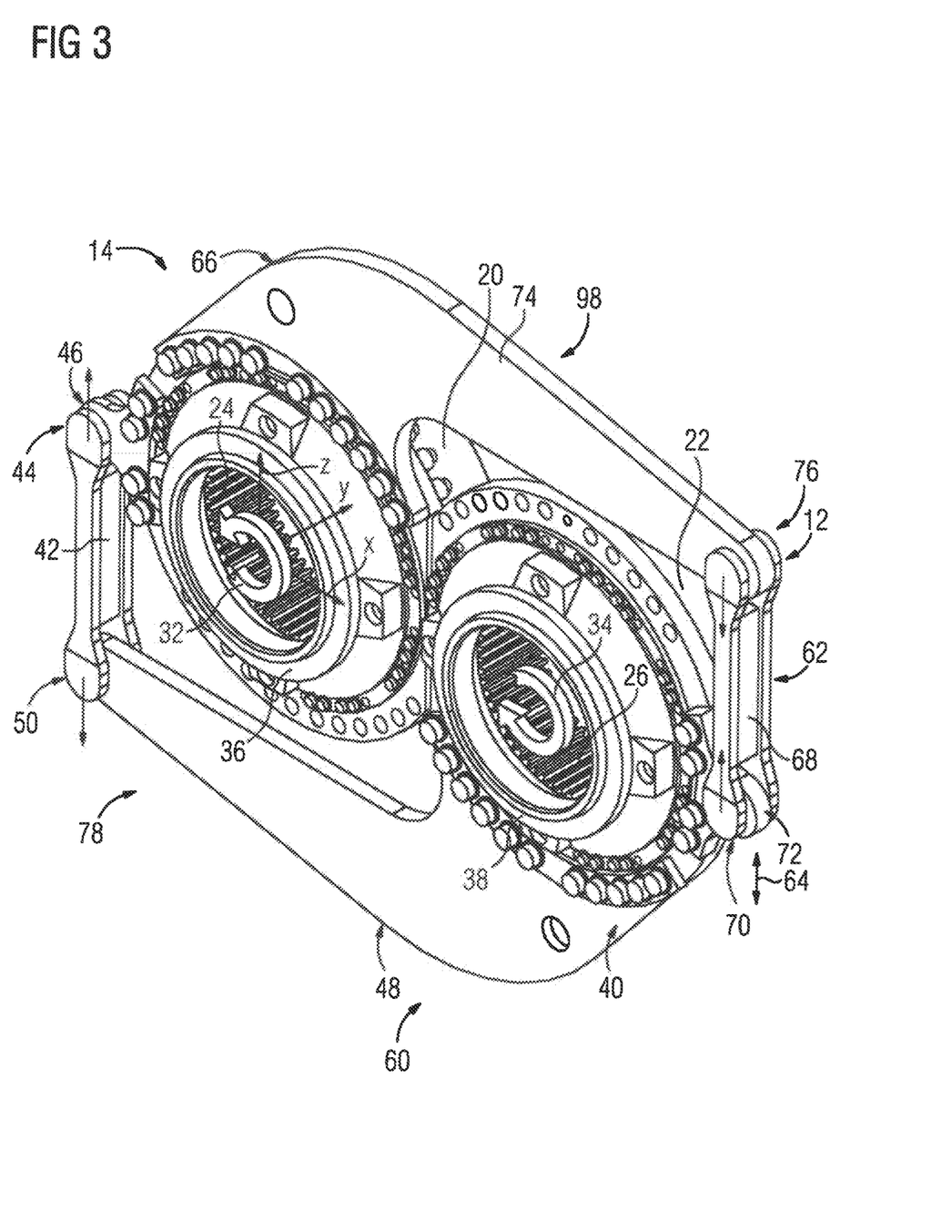
FIG. 3 is a schematic perspective view of part of a further device, wherein FIG. 3 serves to explain the background of the invention.
Figure 4:
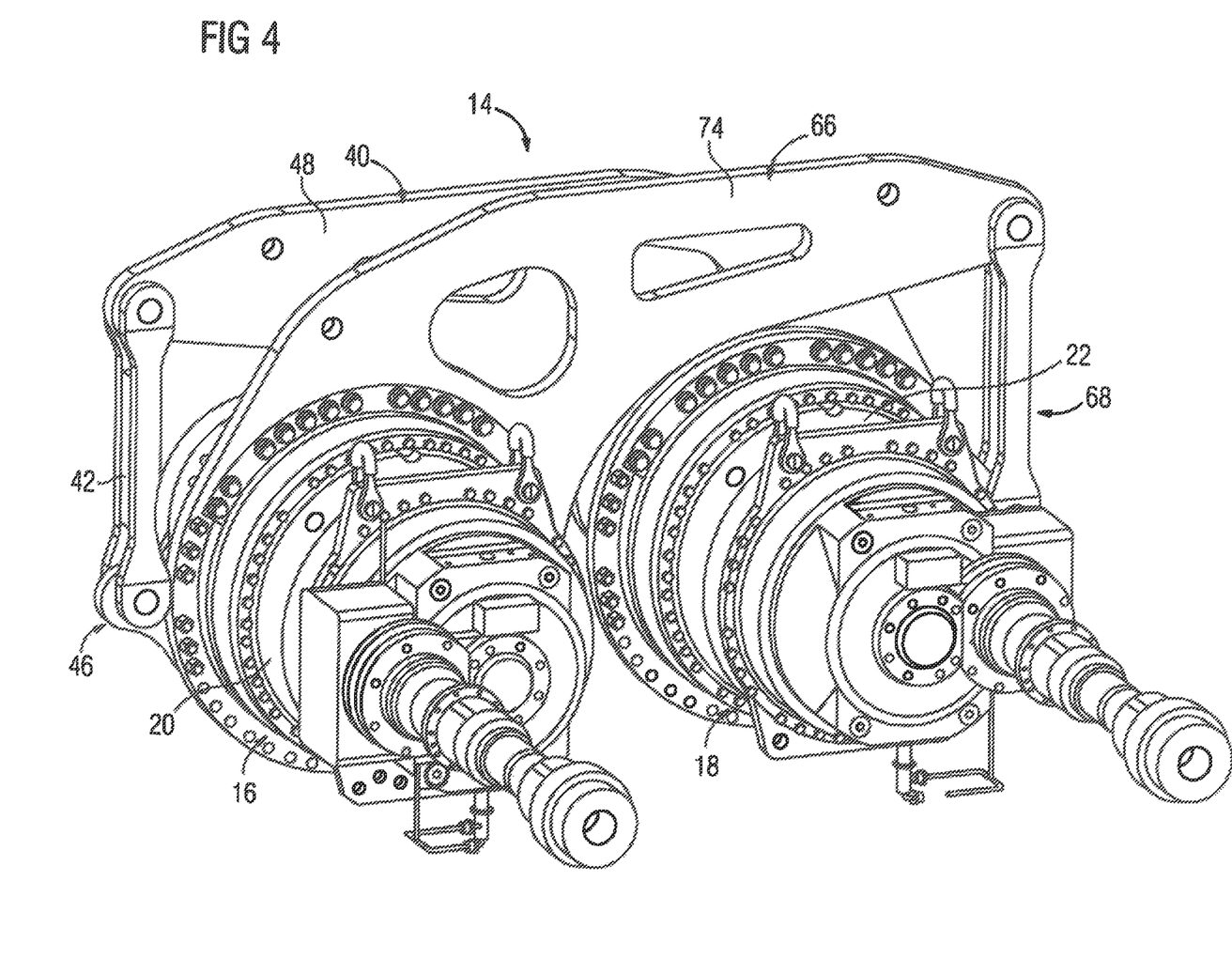
FIG. 4 is a schematic perspective view of the further device, wherein FIG. 4 serves to explain the background of the invention.

FIG. 1 is a schematic perspective view of part of a device 10 in the form of, for example, a comminution machine, which has a supporting device 12, which is also referred to as a torque support or functions as a torque support. FIGS. 3 and 4 show a further device 14, wherein the observations made above and below in relation to the device 10 can readily apply also to the device 14 and vice versa, unless indicated otherwise.

As can be seen in FIG. 4, the device 10 or 14 has a first transmission 16 and a second transmission 18, which are preferably in the form of planetary transmissions and arranged axially parallel. This means that the transmissions 16 and 18 are arranged next to one another and parallel to one another in terms of their respective axial directions. The transmission 16 has a first housing 20, wherein the transmission 18 has a second housing 22. The respective transmission 16 and 18 additionally comprises respective transmission elements. Since the respective transmission 16 or 18 is preferably in the form of a planetary transmission, a respective first of the respective transmission elements is in the form of a sun gear, wherein a respective second of the respective transmission elements is in the form of an internal gear and a respective third of the respective transmission elements is in the form of a planetary carrier. At least one planetary gear is rotatably mounted on the planetary carrier, which planetary gear meshes simultaneously with the respective sun gear and with the respective internal gear. The internal gear of the transmission 16 is visible in FIG. 1 and is designated 24 therein, wherein the internal gear of the transmission 18 is visible in FIG. 1 and is designated 26 therein. For example, at least one of the respective transmission elements of the transmission 16 is rotatable about a first axis of rotation 28 relative to the housing 20. It is further conceivable that at least one of the transmission elements of the transmission 18 is rotatable about a second axis of rotation 30 relative to the housing 22. As can be seen in FIG. 1, the axes of rotation 28 and 30, because the transmissions 16 and 18 are arranged axially parallel to one another, are spaced apart from one another, wherein the axes of rotation 28 and 30 extend parallel to one another.

An arrow 32 in FIG. 1 additionally illustrates a first direction of rotation in which the one transmission element of the transmission 16 is rotatable, or is rotated during operation of the device 10 or 14, about the axis of rotation 28 relative to the housing 20. An arrow 34 in FIG. 1 additionally illustrates a second direction of rotation in which the one transmission element of the transmission 18 is rotatable, or is rotated, in particular during operation of the device 10 or 14, about the axis of rotation 30 relative to the housing 22.

As can be seen with reference to the arrows 32 and 34, the directions of rotation, and thus the transmission elements rotatable about the axes of rotation 28 and 30 relative to the housings 20 and 22, are counter-rotating or in opposite directions. In other words, during operation of the device 10 or 14, the transmission elements of the transmissions 16 and 18 that rotate about the axes of rotation 28 and 30 relative to the housings 20 and 22 are counter-rotating, or rotate in opposite directions.

The device 10 or 14 has, for example, a first drive shaft associated with the transmission 16, wherein the device 10 or 14 has, for example, a second drive shaft associated with the transmission 18. The drive shafts are also referred to as shafts or machine shafts. The first drive shaft is, for example, rotatable about a first shaft axis relative to the housings 20 and 22, wherein the first drive shaft has the first direction of rotation. This means that, during operation of the device 10 or 14, the first drive shaft rotates in the first direction of rotation about the first shaft axis of rotation relative to the housings 20 and 22. It is preferably provided that the first shaft axis of rotation coincides with the first axis of rotation 28. The one transmission element of the transmission 16, for example, is thereby arranged on the first drive shaft. Alternatively or in addition, the one drive element of the transmission 16 can be connected in a rotationally secure manner to the first drive shaft Drive power can thereby be introduced into the first transmission 16 via the first drive shaft, whereby the first transmission 16 is drivable or, in particular during operation of the device 10 or 14, is driven.

The second drive shaft is rotatable about a second shaft axis of rotation relative to the housings 20 and 22, wherein the second drive shaft has the second direction of rotation. The second drive shaft, during operation of the device 10 or 14, thus rotates about the second shaft axis of rotation in the second direction of rotation relative to the housings 20 and 22. It is thereby conceivable that the second shaft axis of rotation coincides with the second axis of rotation 30. For example, the one transmission element of the transmission 18 is arranged on the second drive shaft and/or the one transmission element of the transmission 18 is connected in a rotationally secure manner to the second drive shaft. Drive power can thus be introduced, for example, into the transmission 18 via the second drive shaft, whereby the transmission is drivable or is driven during operation of the device 10 or 14. Overall, it can be seen that the drive shafts rotate in opposite directions or are counter-rotating during operation. In particular it is conceivable that the transmission 16 is mounted on the first drive shaft, in particular such that the one transmission element of the transmission 16 is mounted on the first drive shaft. Alternatively or in addition, the transmission 18 is mounted on the second drive shaft, in particular such that the one transmission element of the transmission 18 is mounted on the second drive shaft. The shaft axes of rotation are thereby spaced apart from one another, wherein the shaft axes of rotation preferably extend parallel to one another.

Directions are additionally illustrated in FIG. 1 by arrows x, y and z. The direction illustrated by the arrow x and the direction illustrated by the arrow y extend perpendicularly to one another, wherein the direction illustrated by the arrow z extends perpendicularly to the direction illustrated by the arrow x and perpendicularly to the direction illustrated by the arrow y. The direction illustrated by the arrow y, for example, extends in the axial direction of the transmission 18 and thus along the axis of rotation 28, This means that the axis of rotation 28 extends along the axial direction of the transmission 16, and the axis of rotation 30 extends along the axial direction of the transmission 18.

In particular it is conceivable that the internal gear 24 is coupled or connected in a torque-transmitting, in particular rotationally secure, manner to the housing 20. It is further conceivable that the internal gear 26 is connected or coupled in a torque-transmitting, in particular rotationally secure, manner to the housing 22. In particular, the internal gear 24 can be formed in one piece with the housing 20, wherein the internal gear 26 can be formed in one piece with the housing 22. It is further conceivable that the internal gear 24 and the housing 20 are in the form of structural parts which are formed separately from one another and connected together in a rotationally secure manner. The internal gear 26 can be formed in one piece with the housing 22, or the internal gear 26 and the housing 22 are in the form of structural parts which are formed separately from one another and connected together, in particular in a rotationally secure manner.

The supporting device 12 has a first supporting flange 36, also referred to as the first flange, which is connected in a torque-transmitting, in particular rotationally secure, manner to the housing 20. In the exemplary embodiment shown in FIG. 1, the housing 20 and the supporting flange 36 are in the form of structural parts which are formed separately from one another and connected together in a rotationally secure manner. The supporting device 12 further has a second supporting flange 38, which is preferably formed separately from the supporting flange 36. The second supporting flange 38 is connected in a torque-transmitting, in particular rotationally secure, manner to the second housing 22. In the present case it is provided that the supporting flange 38 and the housing 22 are in the form of structural parts which are formed separately from one another and connected together, in particular in a rotationally secure manner. Torques or reaction torques, for example, can thereby be transmitted from the internal gear 24 via the housing 20 to the supporting flange 36, and torques or reaction torques can be transmitted from the internal gear 26 via the housing 22 to the supporting flange 38.

The supporting device 12 additionally has a first support 40, via which a supporting force can be transmitted from the first supporting flange 36 to the second supporting flange 38. This supporting force results, for example, from the respective torque or reaction torque which is transmitted from the internal gear 24 via the housing 20 to the supporting flange 36. The respective torque or reaction torque, for example, can thus be transmitted from the internal gear 24 via the housing 20 to the supporting flange 36 and from the supporting flange 36 via the support 40 to the supporting flange 38, whereby, for example, the torque or reaction torque is supported and rotation of the internal gear 24 can be limited or avoided. The support 40 thereby has a first lever element 42, also referred to as a first strut or first strut element, which is coupled in an articulated manner by means of exactly one first linkage 44 with a first attachment element 46 provided on the first supporting flange 36 and thus in an articulated manner with the first supporting flange 36. The first attachment element 46 and the first supporting flange 36 are, for example, structural parts which are formed separately from one another and connected together, in particular in a torque-transmitting or rotationally secure manner. The first attachment element 46 is also referred to as the first lug, since the first attachment element 46 protrudes, in particular outwards, from the first supporting flange 36 in the radial direction of the first transmission 16.

The first support 40 additionally has a supporting element 48 which is coupled in an articulated manner by means of exactly one second linkage 50 with the first lever element 42. The first supporting element 48 is additionally connected in a torque-transmitting, in particular rotationally secure, manner to the second supporting flange 38. Overall, it can be seen that the lever element 42 is attached in an articulated manner to the attachment element 46 and in an articulated manner to the supporting element 48, so that the lever element 42 is able to rotate or pivot, in particular within certain limits, relative to the attachment element 46 and relative to the supporting element 48.

In order to be able to achieve particularly low-load operation, the attachment element 46 has two attachment parts 52 and 64 spaced apart from one another in the axial direction of the transmission 16 and thus along the axis of rotation 28, which attachment parts can be formed in one piece with one another. It is further conceivable that the attachment parts 52 and 54 are in the form of structural parts which are formed separately from one another and connected together, in particular via the supporting flange 36. Since the attachment element 46 is connected in a rotationally secure manner to the supporting flange 36, the attachment parts 52 and 54 are also connected in a rotationally secure manner to the supporting flange 36. For example, the attachment parts 52 and 54 are in the form of metal sheets, that is to say in the form of sheet-metal structural parts.

The supporting element 48 has two supporting parts 56 and 58 spaced apart from one another in the axial direction of the first transmission 16, which supporting parts each form part of the linkage 50. In addition, the attachment parts 52 and 54 each form part of the linkage 44. The first lever element 42 is thereby arranged partly between the attachment parts 52 and 54 and is coupled in an articulated manner with the attachment element 46 via the attachment parts 52 and 54. In addition, the lever element 42 is arranged partly between the supporting parts 56 and 58 and is coupled in an articulated manner with the supporting element 48 via the supporting parts 56 and 58. The attachment parts 52 and 54 are also referred to as first attachment parts, wherein the supporting parts 66 and 58 are also referred to as first supporting parts.

In addition, the second supporting flange 38, for example, is arranged in the axial direction of the second transmission 18 between the supporting parts 66 and 58, which are each connected in a torque-transmitting, in particular rotationally secure, manner to the supporting flange 38. The supporting part 66, for example, is thereby arranged on a first side 60 of the supporting flange 38 and is connected on the side 60 in a torque-transmitting, in particular rotationally secure, manner to the supporting flange 38. The supporting part 58 is preferably arranged on a second side 62 of the supporting flange 38 remote from the first side 60 of the supporting flange 38 in the axial direction of the second transmission 18 and is connected on the second side 62 in a torque-transmitting, in particular rotationally secure, manner to the supporting flange 38. Overall, it can be seen that a double-section articulated attachment of the supporting element 48 to the lever element 42 and a double-section, rotationally secure attachment of the supporting element 48 to the supporting flange 38 is thereby shown. Excessive bending stresses, for example, on the supporting flange 38, which in particular is tensile-loaded, can thereby be avoided. In other words, during operation of the device 10, the supporting flange 38, for example, because the torque or reaction torque is transmitted from the transmission 16 via the support 40 to the supporting flange 38, is tensile-loaded, in particular only tensile-loaded, via the support 40. However, by means of the double-section attachment, excessive bending stresses on the supporting flange 38 can be avoided. It is further preferably provided that the lever element 42 is formed in one piece. Alternatively or in addition it is provided that the respective supporting flange 36 or 28 is in the form of a cast structural part. In addition, based on an installed position of the supporting device 12 and the device 10 or 14 illustrated in FIG. 1 to 4, the first supporting element 48 is arranged at least predominantly, in particular completely, beneath the supporting flanges 36 and 38 in a vertical direction illustrated in FIG. 1 by a double arrow 64.

The supporting device 12 has a second support 66 via which a second supporting force can be transmitted from the second supporting flange 38 to the first supporting flange 36, in particular during operation of the device 10 or 14. A respective torque or reaction torque can thereby also be transmitted during operation of the device 10 or 14 from the internal gear 26 via the housing 22 to the supporting flange 38 and from the supporting flange 38 via the second support 66 to the supporting flange 36, whereby rotation of the internal gear 26 or of the housing 22 is at least limited or prevented. The second support 66 has a second lever element 68, also referred to as a second strut or second strut element, which is coupled in an articulated manner by means of exactly one third linkage 70 with a second attachment element 72 provided on the second supporting flange 38 and thus in an articulated manner with the second supporting flange 38. For example, the attachment element 72 is formed in one piece. Alternatively or in addition, the attachment element 72 and the supporting flange 38 are in the form of structural parts which are formed separately from one another and connected together in a torque-transmitting, in particular rotationally secure, manner. In the exemplary embodiment shown in FIG. 1, the attachment element 72 is arranged on the side 60 and connected on the side 60 in a rotationally secure manner to the supporting flange 38.

The second support 66 further comprises a second supporting element 74, which in the exemplary embodiment shown in FIG. 1 is formed in one piece. The second supporting element 74 is connected in an articulated manner by means of exactly one fourth linkage 76 to the second lever element 68, so that the lever element 68 is able to pivot or rotate within certain limits relative to the attachment element 72 and relative to the supporting element 74. In addition, the second supporting element 74 is connected in a torque-transmitting, in particular rotationally secure, manner to the supporting flange 36, The supporting element 74 is thereby arranged on a first side 78 of the supporting flange 36 and is connected on the side 78 in a torque-transmitting, in particular rotationally secure, manner to the supporting flange 36. The sides 60 and 78 thereby face in the same direction. In particular it is conceivable that the sides 60 and 78 are arranged in a common plane or in the same plane, which extends, for example, perpendicularly to the respective axis of rotation 28 or 30.

Based on the installed position of the supporting device 12 and of the device 10 or 14 shown in the figures, the second supporting element 74 is arranged at least predominantly, in particular completely, above the supporting flanges 36 and 38 in the vertical direction. The space requirement of the supporting device 12 can thus be kept in a particularly small frame. In addition, a particularly advantageous torque or force transmission and in particular torque or force introduction can be achieved, so that the supporting device 12 can be configured to be particularly intricate and thus advantageous in terms of costs, installation space and weight. In particular, a particularly homogeneous introduction of tensile loads in particular into the supporting flange 38 in the form of a cast flange can be achieved.

In the embodiment shown in FIG. 1, the second lever element 68 has two first lever parts 80 and 82 spaced apart from one another in the axial direction of the transmission 18, each of which forms part of the linkage 76. The supporting element 74 is arranged between the lever parts 80 and 82 and connected in an articulated manner to the lever element 68 via the lever parts 80 and 82.

The lever element 68 further has two second lever parts 84 and 86 spaced apart from one another in the axial direction of the transmission 18, between which the attachment element 72, which is preferably formed in one piece, is arranged. The attachment element 72 is connected in an articulated manner to the second lever element 68 via the second lever parts 84 and 86. The attachment element 72 is also referred to as a second lug, since it protrudes, in particular outwards, from the supporting flange 38 in the radial direction of the transmission 18.

The lever parts 80 and 84 are preferably formed by a one-piece, first component 88, wherein the lever parts 82 and 86 are preferably formed by a one-piece, second component 90. The components 88 and 90 are in the form of structural parts which are formed separately from one another, connected together and spaced apart from one another in the axial direction of the transmission 18. In particular it is conceivable that the respective component 88 or 90 is in the form of a sheet-metal part or sheet-metal structural part. Alternatively or in addition, the respective supporting part 56 or 58 is in the form of a sheet-metal part or sheet-metal structural part. Overall, it can be seen that the supporting flange 38 is arranged in the axial direction of the transmission 18 between respective supporting regions 92 and 94 of the supporting element 48, wherein the supporting region 92 is formed in one piece with the supporting part 56 and the supporting region 94 is formed in one piece with the supporting part 58. The supporting element 48 is thus configured to be torque-transmitting, in particular rotationally secure, with the supporting flange 38 via the supporting regions 92 and 94. In other words, the supporting part 56, for example, forms the supporting region 92, and the supporting part 58 forms the supporting region 94.

As an alternative to the embodiment shown in FIG. 1, it is conceivable that the supporting element 74 is configured like the supporting element 48, the attachment element 72 is configured like the attachment element 46, and the lever element 68 is configured like the lever element 42, whereby particularly low-load operation can be achieved.

Figure 2:
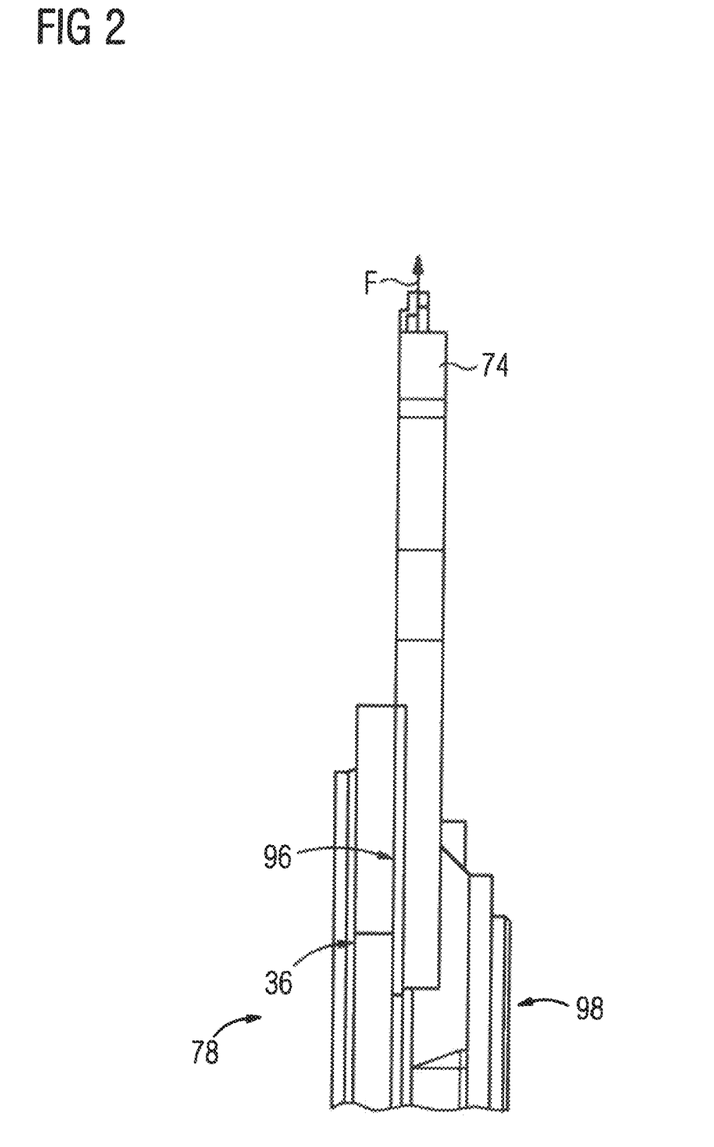
FIG. 2 is a schematic side view of part of the device.

FIG. 2 shows the device 10 according to FIG. 1 in a schematic side view. The torque-transmitting, in particular rotationally secure, attachment of the supporting element 74 to the supporting flange 36 can be seen particularly clearly in FIG. 2. In particular, the supporting element 74 and the supporting flange 36 are connected together in a torque-transmitting manner and in particular supported against one another, in particular directly, in the axial direction of the transmission 16 via respective connecting surfaces 96, also referred to as joint surfaces. A force arrow F in FIG. 2 illustrates a force which can occur, for example, during operation of the device 10. Accordingly, FIG. 2 shows particularly clearly an eccentric force application, in particular of the supporting element 74 on the supporting flange 36. In particular when the supporting element 48—as described hereinbefore—is connected in a rotationally secure manner to the supporting flange 38 both on the side 60 and on the side 62 that is remote from the side 60, a particularly homogeneous or homogenized load introduction into the supporting flange 38 can be achieved. This can also be transmitted to the supporting flange 36. In the exemplary embodiment shown in FIGS. 1 and 2, the supporting element 74 is arranged on a side 98 of the supporting flange 36 that is remote from the side 78 of the supporting flange 36 in the axial direction of the transmission 16 and is connected in a rotationally secure manner to the supporting flange 36 on the side 98.

Alternatively it is conceivable that the supporting element 74 also has second supporting parts spaced apart from one another in the axial direction of the transmission 16 or 18, between which the supporting flange 36, for example, is arranged. In other words, the supporting element 74, for example, has the second supporting parts, which form second supporting regions spaced apart from one another in the axial direction of the transmission 16 or are formed in one piece with the second supporting regions, wherein the supporting flange 36 is arranged between the second supporting regions or between the second supporting parts of the supporting element 74 just as the supporting flange 38 is arranged between the supporting parts 56 and 58 or between the supporting regions 92 and 94. One of the second supporting parts, for example, is thus arranged on the side 78 and connected in a rotationally secure manner to the supporting flange 36 on the side 78. The second of the second supporting parts is arranged on the side 98 and connected in a rotationally secure manner to the supporting flange 36 on the side 98. An excessive, eccentric force introduction into the supporting flange 36 can thereby be avoided, so that excessive bending stresses on the supporting flange 36 can be avoided.

In the device shown in FIGS. 3 and 4, the two supporting elements 48 and 74, for example, are formed in one piece or, in the device 14 according to FIG. 3, the supporting element 48 is configured like the supporting element 74. In addition, arrows in FIG. 3 illustrate respective forces which can occur during operation of the device 14 and are correspondingly transmitted. In particular, during operation, the supports 40 and 66 each generate a counter-torque to the respective transmission 18 or 16, also referred to as sister transmissions, so that the supporting device 12, which is also referred to as a carrying structure or functions as a carrying structure, must absorb only slight torque fluctuations and the respective weight of the respective transmission 16 or 18. In particular it is conceivable that the drive shafts are displaceable in the axial direction and/or in the radial direction relative to one another.

It can be advantageous for reasons of space to arrange the support 40 beneath the supporting flanges 36 and 38 in the vertical direction and to arrange the support 66 above the supporting flanges 36 and 38 in the vertical direction. By contrast, it is provided in the device 14 according to FIG. 4 that both supports 40 and 66 are arranged above the supporting flanges 36 and 38 in the vertical direction. By contrast, in the embodiment shown in FIG. 1, for example, the strut forces, which act at the supporting elements 48 and 74 and at the lugs, must act contrary to the direction of rotation for torque equalization. This gives rise to the particular feature, compared to the standard supporting system illustrated in FIG. 4, that one of the struts is not tensile-loaded but is compression-loaded. This compression load at the end of the respective support 40 or 66 then leads, for example, to a tensile load on the supporting flange 38 shown on the right in FIG. 1.

The supporting flanges 36 and 38 are preferably designed as cast structural parts and thus formed of a cast material. However, since cast materials are sensitive to tensile loading and react to tensile stress resulting therefrom, it can be disadvantageous that tensile loading generally occurs and the tensile loading—as illustrated in FIG. 2—can cause an additional bending stress via a lever arm, in particular half the support width, resulting from the eccentric force introduction. In order nevertheless to achieve damage-free operation, the supporting device 12 can be designed to be particularly solid and thus cost- and weight-intensive.

As a result of the double-section configuration and attachment shown in FIG. 1 it is, however, possible to avoid excessive bending stress. The supporting device 12 can thus be designed to be intricate and thus advantageous in terms of weight and costs. At the same time, an arrangement of the supports 40 and 66 that is advantageous in terms of installation space is possible, wherein the support 66 is arranged above and the support 40 is arranged beneath the supporting flanges 36 and 38. In other words, an at least substantially homogeneous force introduction into the compression-loaded support 40 or 66 can be achieved by the double-section configuration and attachment. To this end, the lower support 40, in particular the lower supporting element 48, is of double-section design. The respective supporting part 56 or 58 preferably has a first width extending in the axial direction of the respective transmission 16 or 18, wherein the supporting element 74, for example, has a second width extending in the axial direction of the transmission 16 or 18. The first width is preferably half the second width. The same applies, for example, with regard to the respective attachment part 52 or 54 compared to the respective attachment element 72. Accordingly, the respective attachment part 52 or 54, for example, has a third width extending in the axial direction of the transmission 16 or 18, wherein the attachment element 72 has a fourth width extending in the axial direction of the transmission 16 or 18. The third width is preferably half the fourth width.

Unlike in the upper support 66, the lever element 42 no longer extends outside the supporting element 48 and the attachment element 46 but between the attachment parts 52 and 54 and between the supporting parts 56 and 58. The lever element 42 can thereby be designed as a single part or in one piece. By contrast, the lever element 68, for example, is in the form of a welded assembly group. A compression force from the lever element 42 can be transmitted, for example, via the linkage 50 at least substantially homogeneously to the two supporting parts 56 and 58 in the form of supporting halves. This load introduction leads at the supporting flange 38 to bending moments which cancel each other out, so that excessive bending loading and excessive bending stresses in the supporting flange 38 can be avoided. The double-section configuration of the supporting element 48 at the supporting flange 38 additionally leads to twice as much force being transmitted via friction, compared to the upper support 66, than in the case of a single-section attachment, which is provided in the case of the support 66 with regard to the connection of the supporting element 74 to the supporting flange 36 and/or to the lever element 68. Screws which are used, and which are in the form of shoulder screws, for example, by means of which the respective supporting element 48 or 74, for example, is connected in a rotationally secure manner to the respective supporting flange 36 or 38, are additionally relieved of load by the described attachment.

In contrast to the embodiment shown in FIG. 1, the upper support 66 can also be designed in double-section form, like the lower support 40. If the upper support 66, in particular the supporting element 74, is designed in one-part or one-piece form as shown in FIG. 1, the supporting element 74 can be arranged and fastened on the side 78, which is in the form of the front side, for example, or on the side 98, which is in the form of the rear side.

Overall, it can be seen that, by means of the supporting device 12, a particularly advantageous supporting system for the axially parallel planetary transmissions rotating and mounted in opposite directions can be achieved. For this purpose, the supporting device 12, which is also referred to as a supporting system, comprises the support 66 located at the top and the support 40 located at the bottom, which comprises the supporting parts 56 and 58. A respective counter-torque can be introduced into the respective opposite transmission 18 or 16 via the respective lug attached to the respective supporting flange 36 or 38. The lower lever element 42 thereby extends partly between the supporting parts 56 and 58. which are preferably symmetrical, in particular mirror-symmetrical, in form. In addition, the lever element 42 extends partly between the attachment parts 52 and 54, which are preferably symmetrical, in particular mirror-symmetrical, in form.

This can also be applied to the lever element 68 or the supporting element 74.

In particular, the supporting device 12 allows the following advantages to be achieved:

load introduction into the lower support 40 or into the supporting element 48 and the corresponding supporting flange 38 without a bending moment, which leads to a significantly lower load on the tensile-loaded supporting flange 38, so that overdimensioning of the transmission is avoided;

simplification of the construction of the supporting device 12;

smaller wall thicknesses or sheet-metal thicknesses, in particular at the lower lever element 42 and/or at the lower supporting element 48;

structural parts that are more advantageous in terms of weight;

higher processing speeds on burning out;

double-section loading of the shoulder screws;

better utilization of the material;

lower loading of the shoulder screws through two parting lines.

What is claimed is:

1. A supporting device for two transmissions, said supporting device comprising:
    a first supporting flange configured for coupling with a first one of the two transmissions;
    a second supporting flange configured for coupling with a second one of the two transmissions;
    an attachment element provided on the first supporting flange and including two attachment parts spaced apart from one another; and
    a support via which a supporting force is transmittable from the first supporting flange to the second supporting flange, said support including a lever element which is coupled in an articulated manner with the attachment element and as a result in an articulated manner with the first supporting flange, and a supporting element which is coupled in an articulated manner with the lever element and connected to the second supporting flange and which includes two supporting parts spaced apart from one another, said lever element being arranged partly between the attachment parts of the attachment element and partly between the supporting parts of the supporting element and coupled in an articulated manner with the attachment element via the two attachment parts and in an articulated manner with the supporting element via the two supporting parts.

2. The supporting device of claim 1, wherein the lever element is formed in one piece.

3. The supporting device of claim 1, wherein the first and second supporting flanges are each formed as a cast structural part.

4. The supporting device of claim 1, wherein, in an installed position of the supporting device, the supporting element is arranged at least predominantly beneath the supporting flanges in a vertical direction.

5. The supporting device of claim 1, wherein, in an installed position of the supporting device, the supporting element is arranged completely beneath the supporting flanges in a vertical direction.

6. The supporting device of claim 1, further comprising:
    a second attachment element provided on the second supporting flange; and a second support via which a second supporting force is transmittable from the second supporting flange to the first supporting flange, said second support including a second lever element which is coupled in an articulated manner with the second attachment element and as a result in an articulated manner with the second supporting flange, and a second supporting element which is coupled in an articulated manner with the second lever element and connected to the first supporting flange.

7. The supporting device of claim 6, wherein, in an installed position of the supporting device, the second supporting element is arranged at least predominantly above the supporting flanges in a vertical direction.

8. The supporting device of claim 6, wherein, in an installed position of the supporting device, the second supporting element is arranged completely above the supporting flanges in a vertical direction.

9. The supporting device of claim 6, wherein the second lever element includes two first lever parts which are spaced apart from one another, with the second supporting element being arranged between the two first lever parts and coupled in an articulated manner with the second lever element via the two first lever parts, and two second lever parts which are spaced apart from one another, with the second attachment element being arranged between the two second lever parts and coupled in an articulated manner with the second lever element via the two second lever parts.

10. The supporting device of claim 6, wherein at least one of the second supporting element and the second attachment element is formed in one piece.

11. The supporting device of claim 6, wherein the second attachment element includes two second attachment parts spaced apart from one another, and wherein the second supporting element includes two second supporting parts spaced apart from one another, said second lever element being arranged partly between the two second attachment parts and partly between the two second supporting parts and coupled in an articulated manner with the second attachment element via the two second attachment parts and in an articulated manner with the second supporting element via the two second supporting parts.

12. The supporting device of claim 11, wherein the second lever element is formed in one piece.

13. A device, comprising:
a first transmission into which drive power is introducible via a first drive shaft having a first direction of rotation;
a second transmission into which drive power is introducible via a second drive shaft which has a second direction of rotation opposite to the first direction of rotation; and
a supporting device including a first supporting flange coupled with the first transmission, an attachment element provided on the first supporting flange and including two attachment parts spaced apart from one another, a second supporting flange coupled with the second transmission, and a support via which a supporting force is transmittable from the first supporting flange to the second supporting flange, said support including a lever element coupled in an articulated manner with the attachment element and as a result in an articulated manner with the first supporting flange, and a supporting element which is coupled in an articulated manner with the lever element and is connected to the second supporting flange and which includes two supporting parts spaced apart from one another, said lever element being arranged partly between the two attachment parts of the attachment element and partly between the two supporting parts of the supporting element and coupled in an articulated manner with the attachment element via the two attachment parts and in an articulated manner with the supporting element via the two supporting parts.

14. The device of claim 13, wherein the first and second transmissions are each embodies as a planetary transmission.

15. The device of claim 13, constructed in the form of a comminution machine for comminuting material to be comminuted.

* * * * *